United States Patent [19]

Adams

[11] Patent Number: 4,821,423
[45] Date of Patent: * Apr. 18, 1989

[54] INSTRUMENT PRODUCING ELECTRICAL SIGNALS IN RESPONSE TO ACCELERATION FORCES

[76] Inventor: Eric M. Adams, 4740 NE. 29th Ave., Fort Lauderdale, Fla. 33308-4827

[*] Notice: The portion of the term of this patent subsequent to Dec. 13, 2005 has been disclaimed.

[21] Appl. No.: 89,105

[22] Filed: Aug. 25, 1987

Related U.S. Application Data

[63] Continuation-in-part of Ser. No. 934,894, Nov. 25, 1986, Pat. No. 4,790,076.

[51] Int. Cl.[4] ............................................. G01D 15/08
[52] U.S. Cl. .................................. 33/366; 73/517 R; 324/208
[58] Field of Search ................ 33/65, 366; 73/517 R, 73/517 B, 516 R; 324/208, 207

[56] References Cited

U.S. PATENT DOCUMENTS

| | | | |
|---|---|---|---|
| 2,168,885 | 8/1939 | Rickenbach et al. | 33/365 |
| 2,205,544 | 6/1940 | Rylsky | 33/365 |
| 3,877,314 | 4/1975 | Bernin | 73/517 B |
| 4,365,513 | 12/1982 | Iwasaki | 73/517 R |
| 4,498,341 | 2/1985 | Breitbach et al. | 73/517 R |

*Primary Examiner*—William D. Martin, Jr.
*Attorney, Agent, or Firm*—James B. Hinson

[57] ABSTRACT

This invention provides an instrument responsive to acceleration forces. In the preferred embodiment, a body of magnetic material is positioned in a cavity such that it moves to a central position in response to a magnetic field and moves along a preselected path in response to acceleration forces. Means is included permitting the position of the body of magnetic material to be determined. The position of the body of magnetic material relative to the structure of the instrument is an indication of the magnitude of the acceleration force applied to the instrument.

10 Claims, 2 Drawing Sheets

VIEW C-C

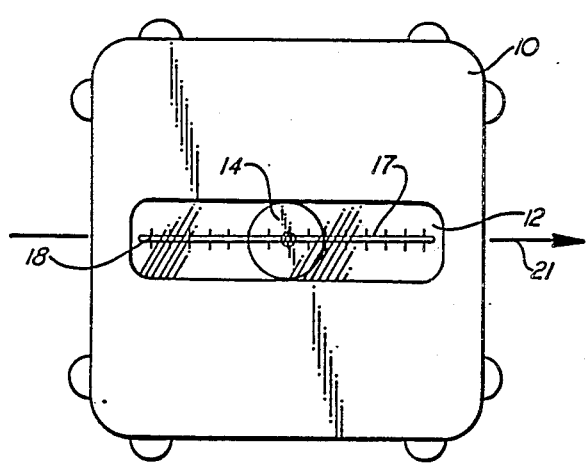
FIG. 1
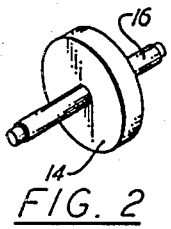
FIG. 2
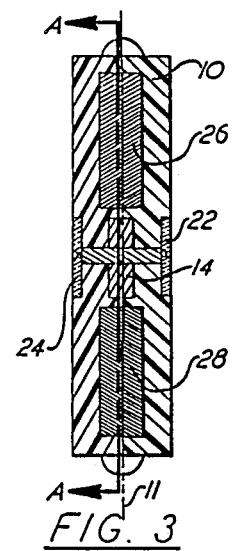
FIG. 3
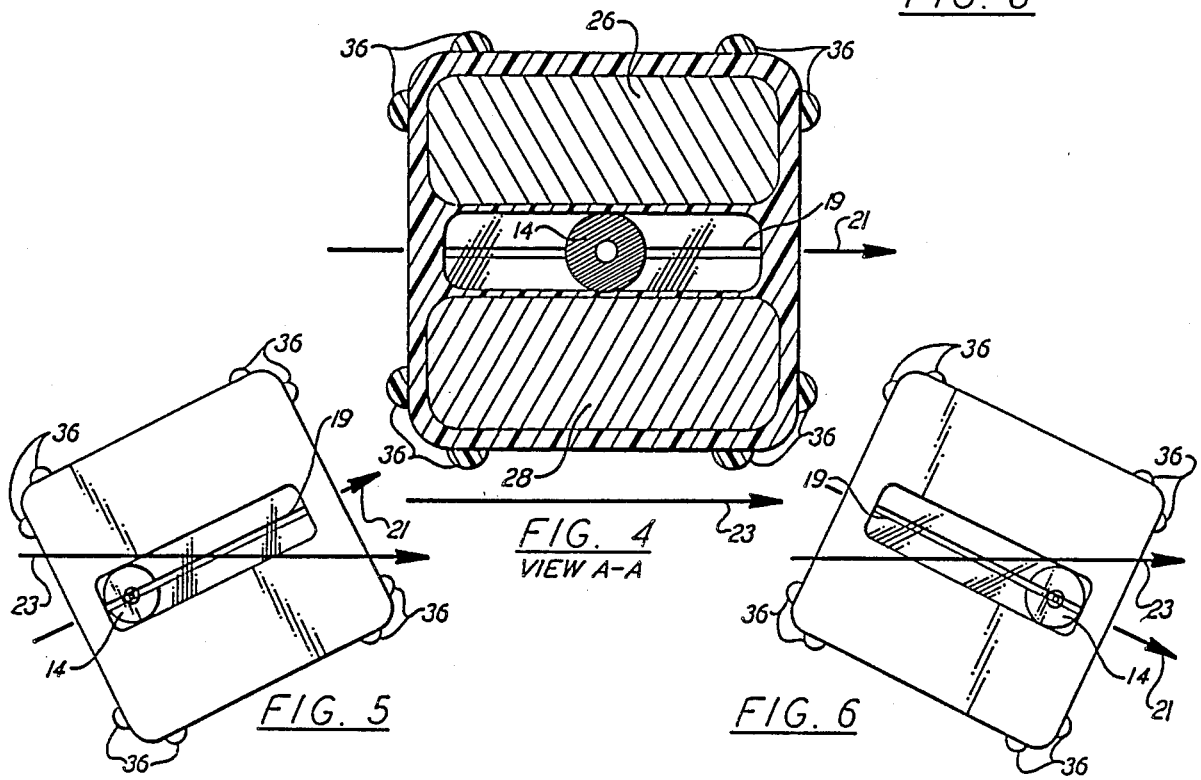
FIG. 4
VIEW A-A
FIG. 5
FIG. 6
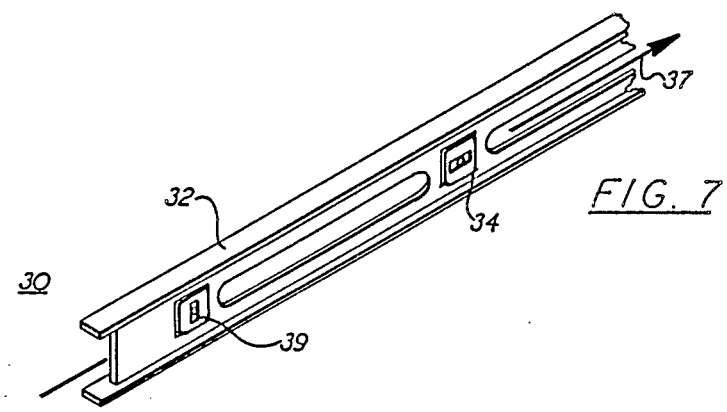
FIG. 7

VIEW C-C

VIEW B-B

INSTRUMENT PRODUCING ELECTRICAL SIGNALS IN RESPONSE TO ACCELERATION FORCES

CROSS REFERENCE TO PRIOR APPLICATION

This is a continuation-in-part of U.S. patent application Ser. No. 934,894, filed Nov. 25, 1986, now U.S. Pat. No. 4,790,076.

BACKGROUND OF THE INVENTION

1. Field of the Invention

The invention relates to instruments for detecting forces and more specifically to an instrument utilizing a body of magnetic material whose position in a cavity changes in response to a vector component of an acceleration force or acceleration forces to which the instrument is subjected.

2. Description of the Prior Art

A prior art patent search was conducted prior to preparing this patent application. This search failed to reveal instruments for measuring acceleration forces using techniques similar to those utilized in the instrument which is the subject of this patent application. However, the following prior art patents illustrate an electronic carpenter's level and various applications of magnetic devices and techniques.

A level using an electrolyte to detect changes in the orientation of the level is illustrated in U.S. Pat. No. 4,654,977.

Devices in which a body of magnetic material is suspended in a cavity by a magnetic field are illustrated in U.S. Pat. No. 4,473,259. This patent also illustrates the use of a control system to adjust magnetic fields to maintain the body of magnetic material at the desired location within the cavity. In the specific embodiment, the device is used as a bearing with a rotating shaft suspended such that it does not mechanically contact any portion of the structure.

Devices for magnetically suspending bodies of magnetic materials are further illustrated in U.S. Pat. No. 4,273,054. The apparatus illustrated in this patent is primarily intended for use in levitating railroad cars. Magnetically levitated railroad cars are further illustrated in U.S Pat. No. 4,356,772. In addition to illustrating magnetic levitation, this patent illustrates methods and apparatus for damping oscillations in the levitated train.

SUMMARY OF THE INVENTION

Acceleration or more specifically, acceleration forces, as used in this patent application refers to the force of gravity, all forces that induce changes in the velocity of a body or both. The instrument which is the subject of this patent application responds to all acceleration forces which are within this definition. The preferred embodiment of the invention includes a supporting structure having an outer portion surrounding a cavity. Apparatus is provided for establishing a magnetic field in the cavity. A body of magnetic material is supported in the cavity such that the body of magnetic material tends to move to a preselected position along a predetermined path in response to the magnetic field within the cavity and changes position in response to acceleration forces having vector components parallel to the path along which the body of magnetic material moves.

Apparatus including sensor means, is provided for producing an electrical signal indicative of the position of the body of magnetic material with respect to the predetermined path along which it moves. The position of the body of magnetic material relative to the path along which it moves has a predetermined relationship to the vector component of the applied acceleration force with respect to the axis along which the body or magnetic material moves. The motion of the body of magnetic material is indicative of changes in the vector component of the acceleration forces with respect to this axis. Support for the body of magnetic material is provided by a spindle which moves on opposed rails.

OBJECTS OF THE INVENTION

It is the principal object of the invention to provide an improved instrument responsive to acceleration forces.

It is another object of the invention to provide an instrument which includes a body of magnetic material which moves in a magnetic field in response to an acceleration force with the position of the body of magnetic material sensed using magnetic techniques.

It is also an object of the invention to provide an instrument for producing an electrical signal having a predetermined relationship to the orientation of the instrument with respect to a predetermined axis.

DESCRIPTION OF THE DRAWINGS

FIG. 1 is a front view of a first embodiment of the invention.

FIG. 2 is a drawing illustrating the movable body of magnetic material used in the invention.

FIG. 3 is a first cross sectional drawing of the embodiment of the invention illustrated in FIG. 1.

FIG. 4 is a second cross section view of the embodiment of the invention illustrated in FIG. 1 along view line A—A.

FIG. 5 is a drawing illustrating the instrument comprising the invention inclined at a first angle.

FIG. 6 is a drawing illustrating the instrument comprising the invention inclined at a second angle.

FIG. 7 is a drawing illustrating the use of the instrument comprising the invention used in a carpenter's level as an indicator.

DETAILED DESCRIPTION

Figure 8:
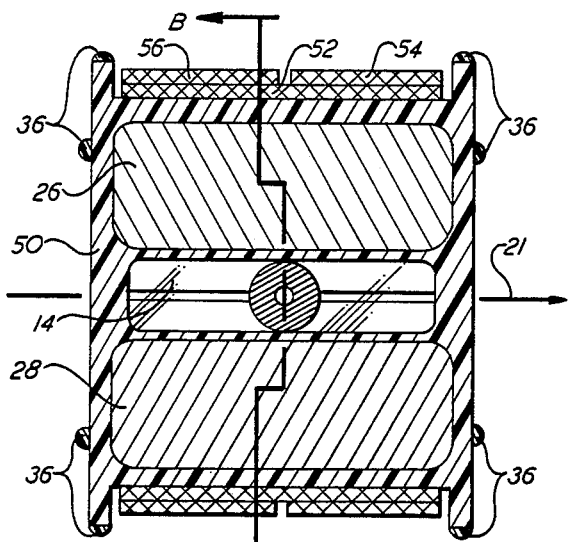
FIG. 8 is a cross section drawing illustrating a second embodiment of the invention which includes sensor means for producing an electrical signal in response to acceleration forces.

The instrument which is the subject of this invention is usable in a wide range of application in which it is desired to measure an acceleration force. For example, it is especially useful in measuring the angular orientation of an object with respect to a predetermined axis. In this application, the instrument measures the acceleration force due to gravity. In other applications the instrument measures acceleration forces, as previously discussed.

In one embodiment, which is the subject of the parent patent application, a visual indication of the acceleration force is provided. In a second embodiment, which is the subject of this application, an electrical signal having a predetermined relationship to the acceleration forces is produced. The electrical signal may be used to drive an indicator device (not illustrated) to produce a visual indication of the applied acceleration force.

The specific application will determine which embodiment of the invention is preferred. The novel features of the invention are discussed more fully below.

FIG. 1 is a front view of the acceleration responsive instrument comprising a first embodiment of the invention. Since the instrument is symmetrical about its major axis 21, this front view is also representative of the back view. This embodiment of the instrument includes a supporting structure 10, which has an outer portion surrounding a cavity 12. A body of magnetic material 14 is supported within the cavity 12. The body of magnetic material 14 (FIG. 2) is generally disklike in shape and is supported on a spindle 16 having opposed ends of a smaller diameter. Opposed ends of the spindle 16 mate with two slots or tracks 18 and 19 in the front and back plates 22 and 24. The tracks 18 and 19 are positioned parallel to the center line 21 of the instrument. Front and back transparent plates 22 and 24 mate with the supporting structure 10 and with the ends of the spindle 16 permitting the location of the body of magnetic material 14 to be visually determined.

The supporting structure 10 may be made as two mirror image halves divided along axis 11. Such construction simplifies assembly of the instrument. If the supporting structure 10 is constructed as to mirror image halves, any convenient means may be utilized to hold the components of the instrument in the assembled position, as illustrated. A second embodiment of the invention includes sensor means for generating an electric signal indicative of the position of the body of magnetic material, the movement of magnetic material 14 or both.

Two permanent magnets, 26 and 28, are positioned substantially symmetric with respect to the cavity 12 to form a magnetic field therein. These magnets are polarized along their short dimension (i.e., transverse to the center line 21 of the instrument) with like poles of magnets 26 and 28 positioned adjacent to the front portion of the supporting structure 10.

FIGS. 3 and 4 are differing cross sectional views of the embodiment of the invention illustrated in FIG. 1. In FIG. 4 the instrument is positioned such that the center line 21 and the channels 18 and 19 are substantially parallel to the horizontal axis 23. In this orientation and in the absence of the instrument being subjected to an acceleration force, the magnetic fields created by permanent magnets 26 and 28 causes the body of magnetic material 14 to move to the central portion of the instrument, as illustrated in FIGS. 1 and 4. The visual scale 17 is normally calibrated to indicate "Zero" when the body of magnetic material 14 is in this position.

FIG. 5 is a front view of the instrument illustrated in FIG. 1 oriented such that the major axis 21 of the instrument is inclined at a first angle with respect to the horizontal axis 23. In this orientation of the instrument, the body of magnetic material 14 moves to the left along the channels 18 and 19 to a position illustrated in FIG. 5. The amount of movement of the body of magnetic material 14 depends on the degree of inclination of the instrument with respect to the horizontal axis 23 as well as the detailed design of the instrument. FIG. 5, being only an example to illustrate that in this orientation, the body of magnetic material 14 moves away from its central position under the influence of gravity (one example of an acceleration force) thereby indicating that the instrument is inclined with respect to the horizontal axis 23. The visual scale 17 is selected to produce a predetermined relationship between the position of the body of magnetic material 14 and the corresponding value of this scale 17.

FIG. 6 is a second view of the embodiment of the invention illustrated in FIG. 1 inclined at a second angle with respect to the horizontal axis 23. In this view, the body of magnetic material 14 moves to the right of its central position indicating that the instrument is inclined at a second angle with respect to the horizontal axis 23. As with FIG. 5, the amount of movement of the body of magnetic material 14 depends on the detailed design of the instrument and the degree of inclination of the instrument with respect to the horizontal axis 23. This figure is an example illustrating that, in this orientation of the instrument, the body of magnetic material 14 moves to the right under the influence of gravity. In this orientation, there is also a predetermined relationship between the position of the body of magnetic material 14 and the corresponding value of the scale 17.

FIG. 7 illustrates the application of the invention to adapt it for use as an indicator in a carpenter's level 30. The level 30 utilizes two instruments of the type discussed above. This embodiment includes a generally "I" shaped beam 32, which serves as the body of the level. One of the instruments 34 is mounted such that its center line 21 is parallel to the major axis 37 of the generally "I-shaped" member 32. The second instrument 39 is mounted such that its center line 21 is perpendicular to the major axis 37. This provides means for the level 30 to be used to detect when structures are in either the horizontal or vertical orientation. For example, when the I-shaped beam 30 is horizontal, the movable body of magnetic material 14 associated with the first instrument 34 will be in its central position, as illustrated in FIG. 1. Similarly, the second instrument 39 is used to determine when structures are vertical with the vertical position corresponding to a central orientation of the movable body of magnetic material 14 in the second instrument 39.

Outwardly extending alignment and latching members 36 are provided on each edge of the instrument. Selected individual members 36 may be spring loaded (not illustrated in detail) such that the latches can be depressed, permitting the instrument to be slid transversely into a suitable mount, which includes depressions which cooperate with the latches 36 to hold the instrument in the desired position relative to the mount.

Figure 11:
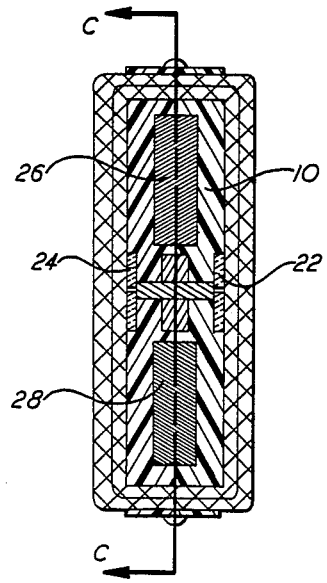
FIG. 11 is a cross sectional view along line B—B of FIG. 8.

FIG. 8 is a cross sectional view of a second embodiment of the invention. This embodiment includes electrical sensor means for detecting the position of the body of magnetic material 14. More specifically, the instrument body 50 includes two notch portions in which first, second, and third electrical windings 52, 54, and 56 are positioned. The major axis of these windings is substantially parallel to the major axis 21 of the instrument. Precise alignment of the major axis of these windings with the axis 21 of the instrument is not required, however, significant misalignment may affect the sensitivity of the instrument. As in the previous embodiments, the body of magnetic material 14 moves along axis 21 of the instrument in response to acceleration forces. A change in the position of the body of magnetic material 14 produces a change in the magnetic field which interacts with the windings 52, 54 and 56. A voltage is induced in each of the windings as the body of magnetic material 14 moves in the magnetic field. This feature permits either of the windings 52, 54, or 56 to be used to detect movement of the body or magnetic material 14. Additionally, the mutual magnetic coupling between the windings changes as the body of magnetic 14 moves. These interactions between the body of magnetic material 14 and the windings permits the windings to be utilized as a differential transformer to generate electrical signals indicating the position of the body of magnetic material 14. For further clarity, this embodiment of the invention along view line B—B is illustrated in FIG. 11.

Figure 9:
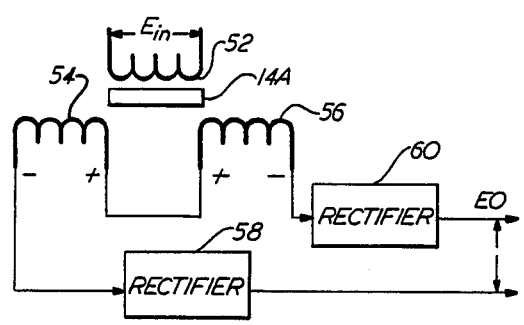
FIG. 9 is an electrical schematic diagram of a first embodiment of the sensor means.

FIG. 9 is a schematic diagram illustrating how the windings 52, 54, and 56 can be interconnected as a movable core differential transformer to produce an electrical signal indicative of the position of the body of magnetic material 14 along the major axis 21 of the instrument. In this embodiment the first winding 52 serves as the primary winding and is connected to an alternating signal source E. Windings 54 and 56 are secondary windings and are coupled to the primary winding 52 by mutual induction. Mutual magnetic coupling between the first winding 52 and the second and third windings 54 and 56 causes an alternating voltage to be introduced into windings 54 and 56 as a result of an alternating input voltage to winding 52. The magnitude of the voltage induced into each of the secondary windings 54 and 56 depends on the mutual coupling to primary winding 52 and the amplitude of the input voltage to the primary winding 52. The movable body of magnetic material is functionally illustrated at reference numeral 14A. As the body of magnetic material moves in one direction, for example, to the left, the mutual magnetic coupling between primary winding 52 and secondary winding 54 increases while the mutual magnetic coupling between primary winding 52 and secondary winding 56 decreases. These windings are connecting in phase opposition. By measuring the combined output, and considering the phase relative to the input voltage, the position of the body of magnetic material along the axis 21 can be determined.

If desired, the output signals of the winding 54 and 56 can be rectified by first and second rectifier circuits 58 and 60. The output voltage of these rectifiers can be summed in polarity opposition such that when the body of magnetic material 14 is in its central position, corresponding to equal mutual coupling between the primary and secondary windings, the output voltage is zero. Movement of the body of magnetic material 14 in first and second opposed directions respectively produces a positive and a negative output signal whose absolute magnitude has a predetermined relationship to the position of the body of magnetic material 14.

Figure 10:
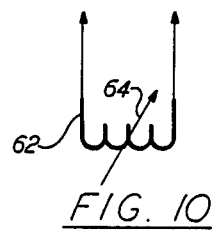
FIG. 10 is an electrical schematic diagram of a second embodiment of the sensor means.

As previously discussed, each of the windings 52, 54, and 56 are subjected to a changing magnetic field as the body of magnetic material 14 moves. This characteristic enables an individual winding to be utilized to detect changes in the acceleration forces to which the instrument is subjected. To further illustrate this feature, a typical winding 62 is shown in FIG. 10. As the body of magnetic material 14 moves the magnetic field to which the winding 62 is subjected changes as functionally indicated by an arrow 64. Thus, as an acceleration force or change therein causes the body of magnetic material 14 to change position along axis 21 a varying voltage is induced in the winding 62. Either of the three windings illustrated may be used as described above to detect changes in acceleration forces.

Alternatively, the acceleration responsive device may be constructed with only one winding. A device constructed or used in this manner comprises a third embodiment of the invention.

The magnitude of and changes in the magnetic field 64 are determined by the materials from which the instrument is constructed and the magnitude of and changes in the acceleration forces. For a particular embodiment a predetermined relationship exists between the voltage signals induced in winding 62 and the changes in the acceleration forces to which the instrument is subjected.

It will be appreciated by those skilled in the art that various embodiments of the instrument comprising the invention may have unique advantages, depending on the specific application. The instrument may be used to measure accelerations producing changes in speed, provided the vector representing change in speed and the associated acceleration force has a component parallel to the horizontal axis 21 of the instrument. For example, if the instrument 10 is moving and experiences a change in speed whose vector representation has a component parallel to its axis 21, the position of the movable body of magnetic material 14 will change relative to the instrument. The magnitude of the component of the acceleration parallel to the axis 21 determines the displacement of the body of magnetic material 14 from its central position. The capability of measuring a vectorial component of acceleration forces permits the instrument, indicated by reference numeral 10, to be used in other applications. Such applications include, but are not limited to, vehicular instrumentation, balancing systems for structures, industrial instrumentation and automated manufacturing apparatus.

For measuring accelerations producing changes in speed when the direction of the speed changes is not known, three instruments of the type discussed above oriented perpendicular to each other can be used. Individual instruments measure vector components of the acceleration forces associated with the speed change. The vectors are added to arrive at a magnitude and direction of the associated acceleration force.

What is claimed is:

1. An instrument responsive to acceleration forces, comprising in combination:
   a. a supporting structure having an outer perimeter and cavity therein;
   b. means for providing a magnetic field in said cavity;
   c. a body of magnetic material supported by a spindle;
   d. channel means cooperating with said spindle to support said body magnetic material such that said body of magnetic material changes position in a predetermined manner along a path determined by said channel means within said cavity in response to acceleration forces; and
   e. electrical sensor means responsive to the position of said body of magnetic material for producing an electrical signal having a predetermined relationship to the position of said body of magnetic material.

2. An instrument in accordance with claim 1 wherein said sensor means comprises at least one winding positioned in a predetermined relationship to the axis along which said body of magnetic material moves.

3. An instrument in accordance with claim 2 wherein said sensor means comprises at least three windings positioned substantially concentric with a common axis.

4. An instrument in accordance with claim 3 wherein at least one of said windings is adapted to be coupled to an alternating signal source.

5. An instrument in accordance with claim 4 wherein said second and third windings are connected in phase opposition to produce a signal indicative of the positioning of said body of magnetic material.

6. An instrument in accordance with claim 5 further including first and second rectifier circuits respectively coupled to receive the input signal, the output voltages of said first and second windings.

7. An instrument in accordance with claim 6 wherein said first and second rectifier circuits are connected in polarity opposition to produce an electrical signal indicative of position of said body of magnetic material.

8. An instrument in accordance with claim 3 wherein said at least one winding is subjected to a changing magnetic field as said body of magnetic material moves.

9. An instrument in accordance with claim 8 wherein said changing magnetic field induces a voltage in said at least one winding.

10. An instrument in accordance with claim 9 wherein said voltage has a predetermined relationship to the movement of said body of magnetic material.

* * * * *